United States Patent Office 3,700,440
Patented Oct. 24, 1972

3,700,440

DODGING METHOD IN WHICH THE PHOTOCHROMIC MATERIAL IS STABLE TO LIGHT AND HEAT

Gerald L. McLeod, Lexington, Hollis E. French, Chelmsford, Laura K. Case, Winchester, Elliot Berman, Braintree, and Joseph Casella, Framingham, Mass., assignors to Itek Corporation, Lexington, Mass.

No Drawing. Filed May 20, 1965, Ser. No. 457,481
Int. Cl. G03c *5/04*
U.S. Cl. 96—27 R 4 Claims

ABSTRACT OF THE DISCLOSURE

An improved photographic medium is disclosed comprising a transparent substrate with a radiation sensitive system thereon comprising a dispersion of a photochromic material in a polymeric binder containing at least 5% by weight of polar groups having the structural formulae

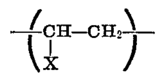

where X represents a hydroxyl group, an amino group, a hydroxyl ether group, an amino ether group or combinations of these. This photographic medium is useful in photographic dodging processes.

This invention relates to photographic media. More precisely the invention disclosed herein relates to improved media which are especially useful in photographic dodging processes involving media comprising photochromic materials.

"Dodging" is a method well known to the photographic art and is used in producing positive prints from negatives in order to achieve a more complete or detailed retrieval of information or images stored in photographic negatives. Essentially, all known dodging methods involve decreasing the effect of the range of density variations of image containing negatives since said variations oftentimes adversely impair detailed readout of the information stored therein. Many methods have been proposed and practiced for decreasing said density variations and said methods include, hand dodging, electronic dodging and dodging using infrared quenching of phosphors. Other proposed dodging methods are set forth in U.S. Pats. 2,420,636 and 2,455,849. To date, the above mentioned methods have not gained especially wide acceptance in the art primarily due to the cost involved in practicing same—such as the high equipment and operating costs involved in electronic dodging—or to the inaccuracy and unreliability inherent in many of the manipulative steps involved in the other dodging methods.

Recently a dodging process has been proposed for producing a positive dodged print by first exposing a media comprising a photochromic material supported by a transparent or translucent substrate through a negative to establish a masked image pattern thereof in said media. Thereafter a media comprising a radiation sensitive layer—such as a silver halide emulsion—is exposed through the superposed negative and photochromic media to establish a latent, dodged, positive image pattern in said layer. The dodged positive image pattern is then developed in accordance with known procedures.

The above-described dodging method is meeting with considerably more widespread acceptance in the art than those methods mentioned previously. However, one outstanding disadvantage in the method is that only a very limited number of positive prints can be produced from the superposed negative and photochromic media. For example, in most cases only three quality positive prints can be produced by exposure of the superposed negative and photochromatic media. This disadvantage is due to the fact that upon exposure of the media through a negative, the light-struck photochromic material is converted to a reversible colored species thereof establishing a colored masking image pattern in said media which is used to effectively decrease the density variations existing in the negative. However, when the masking image containing media is subsequently exposed to the source of radiant energy required to produce a positive print—usually visible light—the colored species reverts to its original form. Hence the masking image pattern established in present photochromic media deteriorates quite rapidly. Accordingly, in order to produce a plurality of positive prints, one must bleach out the masking image pattern in the photochromic media—oftentimes by heating—and thereafter reexpose the photochromic media through the negative in order to restore the masking image pattern therein. Obviously this procedure is time consuming and poses a serious disadvantage for a dodging method which is otherwise relatively simple and inexpensive.

U.S. Pat. 3,160,504 to Montani describes a method whereby a masking pattern is retained in useful form in the photochromic media for a somewhat extended period. Essentially the method disclosed in said patent involves exposing a media comprising a radiation sensitive layer through the superposed negative and photochromic media to a particular light source for a particular increment of time to advantageously extend the useful life of the masking image in the photochromic media. In accordance with the method disclosed, about 6–10 positive prints can be produced without bleaching and subsequently reexposing the photochromic media.

A principal object of the present invention is to provide an improved data storage system.

Another object of the present invention is to provide improved photographic media especially useful in dodging processes.

Still another object of the present invention is to provide an improved photographic dodging process involving media comprising photochromic materials.

Another object of the present invention is to provide an improved photochromic containing media in which an image pattern can be stored which is remarkedly stable to radiant energy which normally causes deterioration of such image patterns within relatively short times.

Other objects and advantages of the present invention will in part appear hereinafter or will in part be obvious to those skilled in the art.

The above objects and advantages are realized in accordance with the practice of our invention by establishing an image pattern—in accordance with known techniques—in a media which comprises a transparent substrate and a radiation sensitive system comprising two essential ingredients: a photochromic material and a particular binder. More specifically, the media of the present invention are those in which the binder and photochromic material represent a continuous phase, that is to say, the photochromic material forms a solid solution in the binder material. Image patterns such as masking image patterns stored in media of the present invention are remarkably stable to visible light and room temperature and as many as 30 or more quality positive prints or more may be obtained therefrom without reexposure thereof as is required in photochromic media heretofore known to the art.

Broadly, the photochromic materials included in the media of the present invention include any photochromic material which upon exposure to radiant energy undergoes a change in polarity. For example, some of the photochromic materials described in the article entitled "Phototropism" in Reviews of Pure and Applied Chemistry, Volume IX, No. 1 (1961), and in Advances in Photochemistry, Volume 1, page 275 ff. Interscience, New York (1963), are useful in the practice of our invention, Especially preferred photochromic materials are those known to the art as spiropyrans. Many of said spiropyrans are normally colorless but when exposed to ultraviolet light having a wavelength of from about 3000 to 4200 A., the spiro-carbon-to-oxygen bond is apparently cleaved or ruptured and the spiropyran is converted to a colored species thereof. This conversion to a colored species is reversible and spiropyrans are either restored to the colorless state by heat or oftentimes merely by exposure to visible light which apparently accounts for the exceedingly short life of masking images stored in present media comprising spiropyrans. Additional details pertaining to spiropyrans can be found in U.S. Pat. 2,953,454. Specific spiropyrans which are especially useful in the practice of the present invention include 1′,1′,3′-trimethyl-6-nitrospiro-[2H-1-benzopyran-2,2′-indoline];
1′,1′,3′-trimethyl-6-nitro-8-methoxyspiro-[2H-1-1-benzopyran-2,2′-indoline];
1′,1′,3′-trimethyl-7-nitrospiro-[2H-1-benzopyran-2,2′-indoline] and
1′,1′,3′-trimethyl-6-nitro-8-alkylspiro-[2H-1-benzopyran-2,2′-indoline].

The amount of photochromic material in media of our invention can vary over a rather wide range. For example, the photochromic material can represented from about 0.01 percent to about 20 percent or higher by weight of the material and binder. However, in most instances, suitable results can be obtained when the photochromic material represents no more than about 5 percent by weight of the material and binder and preferably no more than about 3 percent by weight.

The particular binder selected for inclusion in media of the present invention is an especially critical factor which insures the realization of the advantages which flow from the practice of our invention. The following properties are required of binders which are useful in media of the present invention. The binder must be a binder capable of solubilizing the photochromic material and also comprise sufficient nonacidic polar groups to stabilize the colored polar species produced by exposure of the photochromic material to a suitable source to activating energy. Binders of the above-mentioned properties apparently stabilize the colored species of the photochromic material by way of solvation. Specific binders having a solvation capability suitable for the practice of the present invention include those homopolymers or copolymers or mixture of polymers which comprise at least about 5 percent by weight of an entity of the following generic formula:

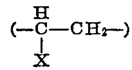

where X is preferably an OH radical or can be a $NH_2$ radical or an ether type radical such as a hydroxyl ether radical having the following structure O—R—OH or an amino ether radical having the following structure

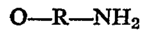

where R—in each case—can comprise from 1 to about 6 carbon atoms. For example, an especially suitable binder in the practice of our invention is a polyvinyl acetate which has been partially hydrolyzed so that between about 10 percent to about 50 percent of the acyl groups thereof are hydrolyzed. Especially preferred polyvinyl acetate binders are those which have been partially hydrolyzed so that between about 20 percent to about 40 percent of the acyl groups thereof are hydrolyzed. Use of polyvinyl acetates having more than 50 percent of the acyl groups hydrolyzed oftentimes present problems in that many of the photochromic materials and said polyvinyl acetates are not mutually soluble in conventional, commercially available organic solvents.

According to a hypothesis which we have postulated but to which we do not intend to be bound, the hydroxyl or like polar groups of binders of the present invention can solvate the colored polar species produced by exposure of the photochromatic material. In this case of the partially hydrolyzed polyvinyl acetate, we believe that the solvation is achieved by way of hydrogen bonding between the hydroxyl groups and the colored specie. We also believe that the solvation effect so achieved is the primary factor which advantageously extends the life of the masking image pattern stored in media of our invention.

Suitable binders also useful in our invention include hydroxyl alkyl celluloses as well as partially hydrolyzed products of related polymers of lower acyl esters such as polyvinyl butyrate and polyvinyl propionate. Also mixtures of polymers such as polyvinyl acetate and the like together with polyvinyl alcohol can be used in the practice of our invention.

Media of the present invention are most conveniently prepared by separately dissolving the photochromic materials and binders of the aforementioned properties in an organic solvent or compatible solvents. Thereafter the separately prepared solutions are mixed together with suitable agitation. It should be pointed out that some care should be taken in the selection of an appropriate solvent since both the binder and photochromic material must be mutually soluble therein. However, this can be readily determined by one well skilled in the art, Suitable solvents include butyl acetate, toluene, xylene, ethyl acetate, methyl acetate, isobutyl acetate, acetone, 2-butanone and the lower alcohols. Usually the photochromic material and binder represent less than about 40 percent by weight of the solution, and the most effective weight ratios of binder to photochromic material are those above about 20:1. Said solutions are then coated by any of the techniques well known to the art on a suitable transparent substrate such as those comprised of polyethylene terephthalate, polyesters, and cellulose acetate.

The advantages and benefits obtained from the practice of our invention will be better understood with reference to the following examples which set forth in illustrative fashion, details of practicing same. It is to be understood that the following examples are illustrative in nature and in no way are they to be construed so as to limit our invention beyond those limitations expressly set forth in the present specification or in the claims which appear hereinafter.

EXAMPLE 1

A solution comprising an organic binder and a combination of photochromic materials was prepared by dissolving about 0.8 gram of 1′,3′,3′-trimethyl-6-nitrospiro-[2H-1-benzopyran-2,2′-indoline] and about 0.2 gram of 1′,3′,3′ - trimethyl - 6-nitro-8-methoxyspiro-[2H-1-benzopyran-2,2′-indoline] in about 4 grams of butyl acetate. The above solution was then mixed with 95 grams of a 28 percent by weight solution of 18 percent hydrolyzed polyvinyl acetate in butyl acetate. The solution of binder and photochormic material was then coated to a dry thickness of about 2 mils on a polyethylene terephthalate film more commonly known as "Mylar."

After drying, the photochromic medium was exposed briefly to an ultraviolet source through a negative.

A silver halide medium covered by a No. 1 Varigam filter was then exposed to a source of visible light through the superposed negative and photochromic medium to establish a latent, positive, dodged print in said medium. About 35 quality positive prints were so produced from the photochromic medium without the bleaching and reexposure steps normally required after producing about 3 prints from photochromic media presently available.

It will be apparent that the medium of the above-described formula is remarkably stable to room temperature and visible light and said medium constitutes an especially preferred embodiment of our invention. For example, the stability of the medium of the above example is such that the colored specie thereof cannot be converted at will to the colorless state merely by being flashed by visible light. Instead the colorless state or bleaching of the masking image pattern can only be effectively achieved by heating the media at temperatures above about 230° F. for about 2 to 3 seconds. Accordingly the media of the present invention qualify for many photostore applications for which conventional photochromic media cannot be used.

EXAMPLE 2

A solution of a photochromic material was prepared by dissolving about 0.8 gram of 1',3',3'-trimethyl-6-nitrospiro[2H-1-benzopyran-2,2'-indoline] in about 4 grams of butyl acetate. The above solution was then mixed with 95 grams of a 30 percent by weight solution of 15 percent hydrolyzed polyvinylbutyrate. The solution of photochromic material and binder was then coated to a dry thickness of about 2 mils on a Mylar film.

About 30 quality positive dodged prints were produced from the photochromic medium in accordance with the procedure set forth in Example 1.

EXAMPLE 3

The photochromic solution of Example 1 was mixed with about 95 grams of a 24 percent solution of a 9 percent hydrolyzed polyvinyl acetate in toluene. The solution of photochromic materials and binder was then coated to about 2 mils dry thickness on a polyester film more commonly known as "Scotchpar."

About 20 quality, positive, dodged prints were produced from the photochromic medium in accordance with the procedure set forth in Example 1.

Many modifications of incidental features involved in the above examples offered for the purposes of illustrating our invention are included within the spirit and scope of our invention as defined in the appended claims.

Having described our invention together with preferred embodiments thereof and manners of practicing same, what we declare as new and desire to secure by U.S. Letters Patent is as follows:

1. In a photographic dodging process including the steps of: (a) exposing a photochromic dodging medium through a negative, said photochromic material being of the type which when exposed to radiant energy undergoes a change in polarity to form a polar product thereof, to thereby establish a masking image pattern in said photochromic medium; and, (b) thereafter exposing a radiation sensitive medium through said photochromic medium and said negative to form a dodged, positive image pattern in said radiation sensitive medium;

the improvement of using a photochromic dodging medium comprising a transparent substrate having thereon a coating of a photochromic material dispersed in a polymeric binder containing at least about 5% by weight of polar groups having the structural formulae

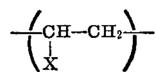

wherein X represents a hydroxyl group, an amino group, a hydroxyl ether group, an amino ether group or combinations of these, said photochromic material being selected from 1',1',3'-trimethyl-6-nitrospiro-[2H-1-benzopyran - 2,2' - indoline] 1',1',3' - trimethyl-6-nitro - 8 - methoxyspiro-[2H-1-benzopyran-2,2'-indoline], 1',1',3'-trimethyl-7-nitrospiro-[2H-1-benzopyran-2,2'-indoline] and 1',1',3'-trimethyl-6-nitro-8-alkylspiro-[2H-1-benzopyran - 2,2' - indoline], the dispersion of said photochromic material in said polar binder thereby allowing said photochromic material to retain its reversibility at elevated temperatures above 230° F. in said binder but also providing said photochromic material with increased stability in its polar form to white light and room temperature.

2. An improvement of claim 1 wherein said binder comprises a partially hydrolyzed polymer of a lower acyl ester.

3. An improvement of claim 2 wherein said partially hydrolyzed polymer of a lower acyl ester comprises polyvinyl acetate which has been partially hydrolyzed so that from about 10% to about 50% of the acyl groups thereof have been converted to hydroxyl groups.

4. An improvement of claim 2 wherein said partially hydrolyzed polymer of a lower acyl ester comprises partially hydrolyzed polyvinyl butyrate.

References Cited

UNITED STATES PATENTS

| | | | |
|---|---|---|---|
| 3,436,353 | 4/1969 | Dreyer et al. | 96—90 |
| 3,320,067 | 5/1967 | Taylor | 252—300 X |
| 3,160,504 | 12/1964 | Montani | 96—90 PC |
| 3,304,180 | 2/1967 | Dorion et al. | 96—90 PC |
| 3,322,678 | 5/1967 | Dorion et al. | 350—160 P |
| 3,346,385 | 10/1967 | Foris | 96—36.2 |

FOREIGN PATENTS

| | | | |
|---|---|---|---|
| 1,406,487 | 6/1919 | France | 96—90 PC |

OTHER REFERENCES

Derwent Abstract of Belgian Pat. 658,272. Derwent Release No. 47, June 8, 1965, p. 3.

Day, J. H. "Thermochromism," Chem. Rev., vol. 63, 1963, "The Spiropyrans, Solvent Effects," pp. 69–70.

Heiligman, R., et al. "Equilibria at Low Temp. in Solutions of the Colored Modifications of Spiropyrans," Proc. Israel Chem. Soc., vol. 8A3, 1959, pp. 152–3.

DONALD LEVY, Primary Examiner

R. E. MARTIN, JR., Assistant Examiner

U.S. Cl. X.R.

252—300; 96—90 PC; 350—160 P